(12) United States Patent
Neeb et al.

(10) Patent No.: US 11,079,144 B2
(45) Date of Patent: Aug. 3, 2021

(54) LINEAR POWER SUPPLY PRE-REGULATOR FOR ELECTRICAL CLIMATE COMPRESSORS

(71) Applicant: Hanon Systems, Daejeon (KR)

(72) Inventors: Christoph Neeb, Haan (DE); Stephan Werker, Merzenich-Golzheim (DE); Philipp Karutz, Cologne (DE)

(73) Assignee: HANON SYSTEMS, Daejeon (KR)

( * ) Notice: Subject to any disclaimer, the term of this patent is extended or adjusted under 35 U.S.C. 154(b) by 369 days.

(21) Appl. No.: 15/647,846

(22) Filed: Jul. 12, 2017

(65) Prior Publication Data

US 2018/0017291 A1 Jan. 18, 2018

(30) Foreign Application Priority Data

Jul. 12, 2016 (DE) .......................... 102016212657.1

(51) Int. Cl.
*F25B 9/00* (2006.01)
*H02P 27/04* (2016.01)
*B60H 1/00* (2006.01)
*F25B 31/00* (2006.01)
(Continued)

(52) U.S. Cl.
CPC ......... *F25B 9/006* (2013.01); *B60H 1/00421* (2013.01); *B60H 1/00428* (2013.01);
(Continued)

(58) Field of Classification Search
CPC ........ F25B 9/006; F25B 9/004; F25B 31/006; F25B 49/022; F25B 2600/021;
(Continued)

(56) References Cited

U.S. PATENT DOCUMENTS 3,373,344 A    3/1968  Seer
3,588,675 A *  6/1971  Shiro ...................... G05F 1/571
                                                        323/303
(Continued)

FOREIGN PATENT DOCUMENTS

DE     1513420 A1    12/1969
EP     2066014 A1     6/2009
(Continued)

OTHER PUBLICATIONS

Van Ham, et al.: "A power and data front-end IC for biomedical monitoring systems", J. Sensors and Actuators 147 (2008), pp. 641-648.

(Continued)

*Primary Examiner* — Gary L Laxton
(74) *Attorney, Agent, or Firm* — McLean IP Global; Jason Y. Pahng

(57) ABSTRACT

Inverter for an electric compressor comprising an auxiliary voltage supply that supplies a control electronics of the inverter with a DC voltage. The auxiliary voltage supply comprises a series circuit of a linear voltage regulator and a linear pre-regulator. The linear pre-regulator comprises a transistor and is connected to the input terminal of the linear voltage regulator. The linear pre-regulator and/or the linear voltage regulator are advantageously actively cooled by a refrigerant utilized in the electric compressor.

7 Claims, 7 Drawing Sheets

(51) Int. Cl.
*B60H 1/32* (2006.01)
*F25B 49/02* (2006.01)
*H02P 9/02* (2006.01)
*H02P 101/45* (2016.01)

(52) U.S. Cl.
CPC ........... *B60H 1/3222* (2013.01); *F25B 9/004* (2013.01); *F25B 31/006* (2013.01); *F25B 49/022* (2013.01); *H02P 9/02* (2013.01); *H02P 27/04* (2013.01); *F25B 2600/021* (2013.01); *H02P 2101/45* (2015.01); *Y02T 10/88* (2013.01)

(58) Field of Classification Search
CPC ............ B60H 1/00421; B60H 1/00428; B60H 1/3222; H02P 9/02; H02P 27/04; H02P 2101/45; Y02T 10/88
See application file for complete search history.

(56) References Cited

U.S. PATENT DOCUMENTS

| | | | | |
|---|---|---|---|---|
| 5,036,269 | A | * | 7/1991 | Murari ................... G05F 1/571 323/266 |
| 8,305,056 | B2 | * | 11/2012 | Wadhwa ................... G05F 1/56 323/270 |
| 2004/0085052 | A1 | | 5/2004 | Itabashi et al. |
| 2006/0108991 | A1 | | 5/2006 | Jiang et al. |
| 2008/0283000 | A1 | * | 11/2008 | Gunther ................. F01P 7/048 123/41.49 |

FOREIGN PATENT DOCUMENTS

| | | |
|---|---|---|
| JP | 2004044535 A | 2/2004 |
| JP | 2004259081 A | 9/2004 |
| JP | 2005155365 A | 6/2005 |
| JP | 2015171282 A | 9/2015 |

OTHER PUBLICATIONS

KR Office Action dated Dec. 23, 2019; Korean Patent Application No. 10-2019-0033640.

DE Office Action dated Jan. 19, 2021; DE Patent Application No. 10 2016 212 657.1.

* cited by examiner

Fig. 1 – Prior Art

LINEAR POWER SUPPLY PRE-REGULATOR FOR ELECTRICAL CLIMATE COMPRESSORS

This application claims priority from German Patent Application No. 102016212657.1 filed on Jul. 12, 2016, which is hereby incorporated by reference in its entirety.

TECHNICAL FIELD

The present invention relates to an inverter for an electric compressor which is utilized, for example, as a refrigerant compressor in an air conditioning system of a motor vehicle.

PRIOR ART

FIG. 1 shows an example of the basic layout of an inverter for an electric compressor according to prior art. Electric compressors (for example electric refrigerant compressors) that are operated across a high voltage bus most often comprise two separate voltage domains on the inverter board. A high voltage domain is supplied with voltage from a high voltage battery (nominal voltage for example 150-500 V). The high voltage domain comprises the motor drive for the electric compressor (for example a B6 bridge equipped with semiconductors) and appropriate regulation electronics shown as power output stage in FIG. 1.

A low voltage domain is supplied from a battery with an on-board voltage (for example 12 V). The low voltage domain comprises a control electronics which carries out communication with a control device (for example an air conditioning control unit of a motor vehicle). In the low voltage domain environmental data, such as for example temperature and the like, are furthermore captured.

In the high voltage domain as well as also in the low voltage domain auxiliary voltages (for example 3.3 V or 5 V) must be made available for ICs, microcontrollers, sensor circuits and the like). This auxiliary voltage supply in prior art takes place by clocked switching regulators (SMPS Switched Mode Power Supply). In switching regulators a switching element (transistor, MOSFET) is triggered with pulse width modulation and current is commutated in a storage inductor whereby different output voltages can be generated, such as is described, for example, in US 2004/0085052 A1.

However, the realization of an auxiliary voltage supply with clocked components known from prior art entails the disadvantage that the switching processes in the electronics of the voltage regulator lead to a considerable electromagnetic interference spectrum. These interferences can affect the electronics itself as well as also other electronic components in the proximity and disturb their function.

To keep these interference effects as low as possible, strict requirements with respect to routing and placement on the circuit board must be met in a design including clocked switching regulators. Such clocked circuit requires furthermore EMC filtering, as shown in FIG. 1, corresponding to the interference spectrum. This filter bank leads to cost increases and additional required space on the circuit board since here also severe restrictions exist with respect to the placement of the filter components and the conductor track routing.

DESCRIPTION OF THE INVENTION

Against this background, one problem addressed by the present invention is realizing the auxiliary voltage supply of the inverter using a simple configuration.

This problem is resolved through the inverter, defined in patent claim 1, for an electric compressor.

Accordingly, the inverter comprises an auxiliary voltage supply supplying a control electronics of the inverter with a DC voltage. The auxiliary voltage supply comprises a series circuit of a linear voltage regulator and a linear pre-regulator. The linear pre-regulator comprises a transistor and is connected to the input terminal of the linear voltage regulator.

The auxiliary voltage supply consequently only comprises linearly driven elements whereby the use of switching regulators is avoided. The layout of the inverter can hereby be significantly simplified and be made more flexible. In particular, use of complex and expensive EMC filters can be forgone and yet an improvement of the EMC capability be achieved.

According to an advantageous implementation the linear pre-regulator and/or the linear voltage regulator are actively cooled by a refrigerant utilized in the electric compressor.

The use of linear regulators generates a power loss, output in the form of heat. The disposition of the inverter on the electric compressor enables the effective absorption of this lost heat by the refrigerant.

According to an advantageous implementation the linear pre-regulator comprises furthermore a regulation unit operating the transistor in the linear range (linear operating point) such that the transistor generates a voltage drop from the input voltage of the auxiliary voltage supply to a predetermined output voltage.

The transistor in this implementation thus serves as a regulatable resistor which reduces the input voltage of the auxiliary voltage supply to a voltage favorable for the linear voltage regulator.

According to an advantageous implementation the transistor when switched on is as low ohmic as is feasible. In this implementation the main portion of the voltage drop consequently takes place in the linear voltage regulator.

According to an advantageous implementation the auxiliary voltage supply comprises furthermore a control unit that monitors the input voltage of the auxiliary voltage supply and switches off the transistor should the input voltage exceed a threshold value and therewith prevents overloading.

During actual operation the input voltage is not completely constant. To avoid damaging the voltage supply, the auxiliary voltage supply is switched off in the event an overvoltage occurs.

According to an advantageous implementation the auxiliary voltage supply comprises furthermore a control unit that, in response to a shutdown signal, switches off the transistor. Accordingly the power consumption of the inverter can be reduced when the electric compressor is not being operated.

According to an advantageous implementation the inverter comprises a high-voltage domain, which supplies a motor of the electric compressor with AC current, and a low-voltage domain, which processes control commands for the control of the electric compressor, and the auxiliary supply disposed in the low-voltage domain.

The present invention is especially suitable for the auxiliary voltage supply in a low-voltage domain of the inverter since at input voltages that are too high the power loss becomes too great in the linear voltage regulator.

According to an advantageous implementation the linear voltage regulator is a low-dropout voltage regulator. It operates with minimal difference between input and output voltage (0.1 V to 1 V). By using a classic LDO with a pre-regulator and active cooling means of the pre-regulator, it is feasible to establish a purely linear voltage supply.

According to an advantageous implementation the transistor is a MOSFET, a metal oxide semiconductor field effect transistor.

An advantageous implementation relates to an electric compressor comprising the inverter.

DESCRIPTION OF PREFERRED EMBODIMENTS

Preferred embodiments of the present invention will be described in detail in the following with reference to the accompanying drawing. Identical or corresponding elements in the different Figures are each denoted by identical or similar reference symbols.

The preferred embodiments of the invention described more comprehensively in the following are described in detail with reference to inverters for an electric compressor utilized in a refrigerant compressor of a motor vehicle. It is however noted that the following description contains only examples and should not be considered as limiting the invention.

Figure 1:
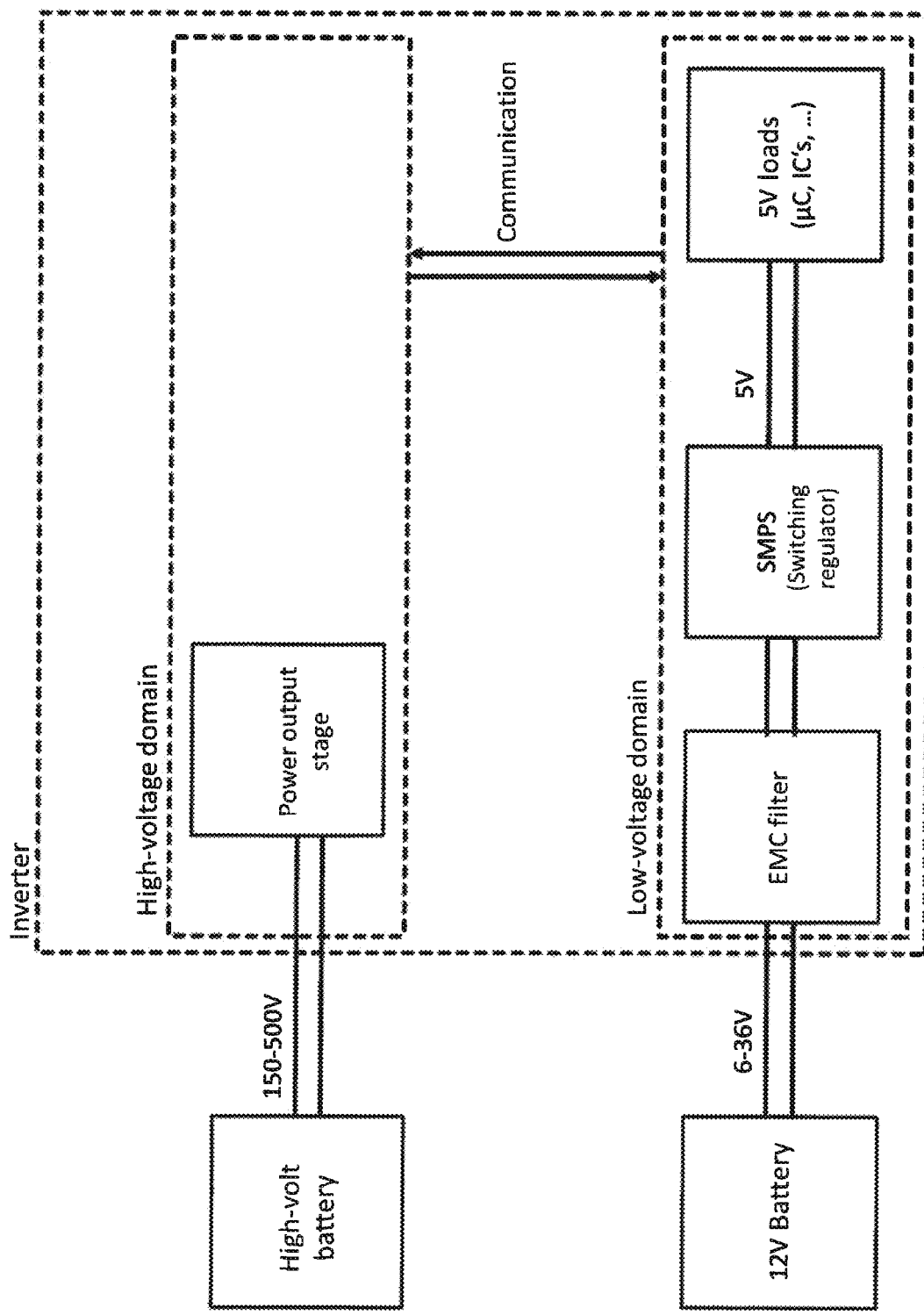
FIG. 1 shows an example of a basic layout of an inverter for an electric compressor according to prior art.
Figure 2:
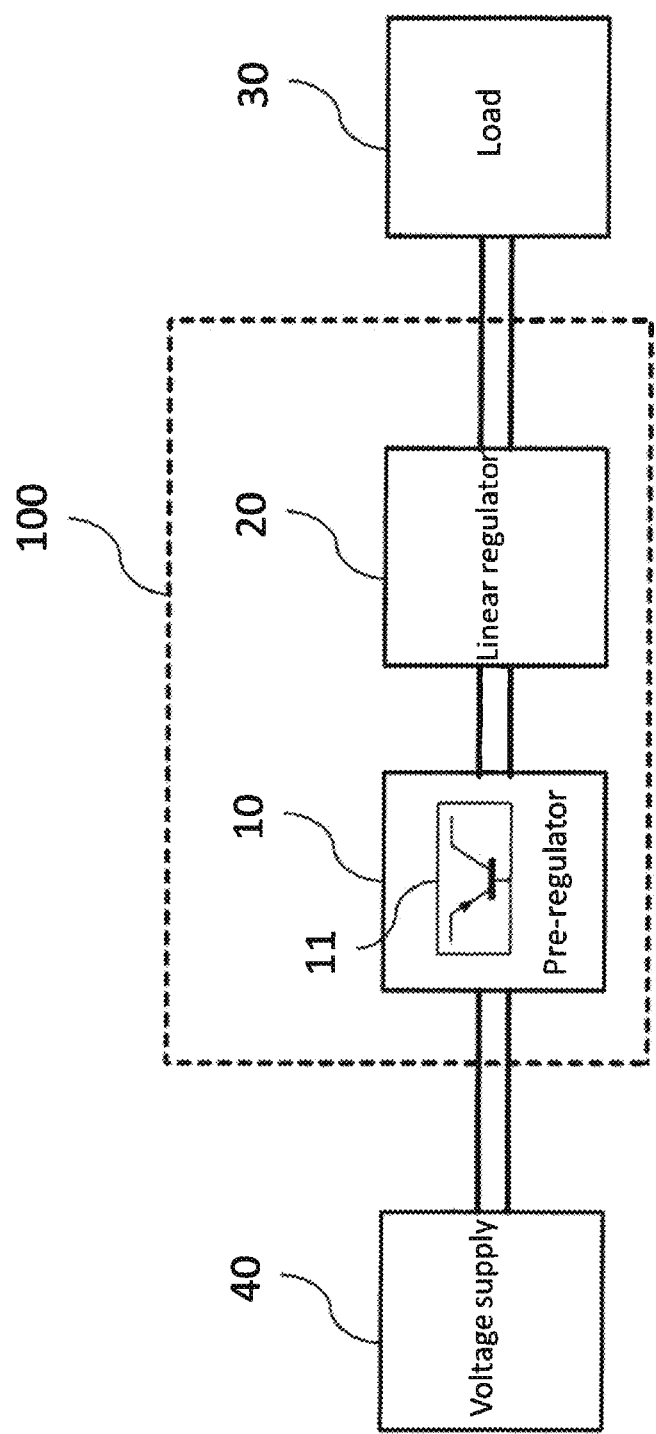
FIG. 2 shows schematically the layout of an inverter according to an embodiment of the present invention.

FIG. 2 shows schematically the layout of an inverter according to an embodiment of the present invention.

The inverter comprises an auxiliary voltage supply 100 supplying a control electronics (load) 30 of the inverter with a DC voltage. The control electronics 30 comprises, for example, ICs, microcontrollers and sensors which must be supplied with constant DC voltage of, for example, 3.3 V or 5 V. The control electronics 30 can receive and process commands from an (air conditioning) control device.

The auxiliary voltage supply 100 is supplied with DC voltage from a voltage supply 40. The voltage supply 40 is, for example, a motor vehicle battery and the DC voltage is 12 V.

The auxiliary voltage supply 100 comprises a series circuit of a linear voltage regulator 20 and a linear pre-regulator 10. The linear voltage regulator 20 is preferably a conventional LDO (Low Drop Out) voltage regulator. The output voltage (for example 5 V) of the linear voltage regulator 20 is supplied to the load 30.

The linear pre-regulator 10 comprises a transistor 11 and is connected to the input terminal of the linear voltage regulator 20. The transistor 11 is, for example, a metal oxide semiconductor field effect transistor (MOSFET) or a simple PNP transistor. Under special conditions the transistor 11 can also be an IGBT (Insulated Gate Bipolar Transistor).

The linear pre-regulator 10 is additionally connected to a voltage supply 40. The linear pre-regulator 10 is consequently disposed between the voltage supply 40 and the linear voltage regulator 20.

The voltage drop from the input voltage of the auxiliary voltage supply 100 (the voltage of voltage supply 40) to the output voltage applied at the load 30 takes place in the linear pre-regulator 10 and/or the linear voltage regulator 20. This voltage drop produces heat which, in a preferred embodiment, is dissipated through the active cooling by a refrigerant utilized in the electric compressor. If, for example, an input voltage of 12 V is to be converted into a 5 V supply voltage for the load 30 with 300 mA current consumption, a voltage drop of 7 V is generated resulting in a power loss in the form of heat of 2.1 W.

Figure 3:
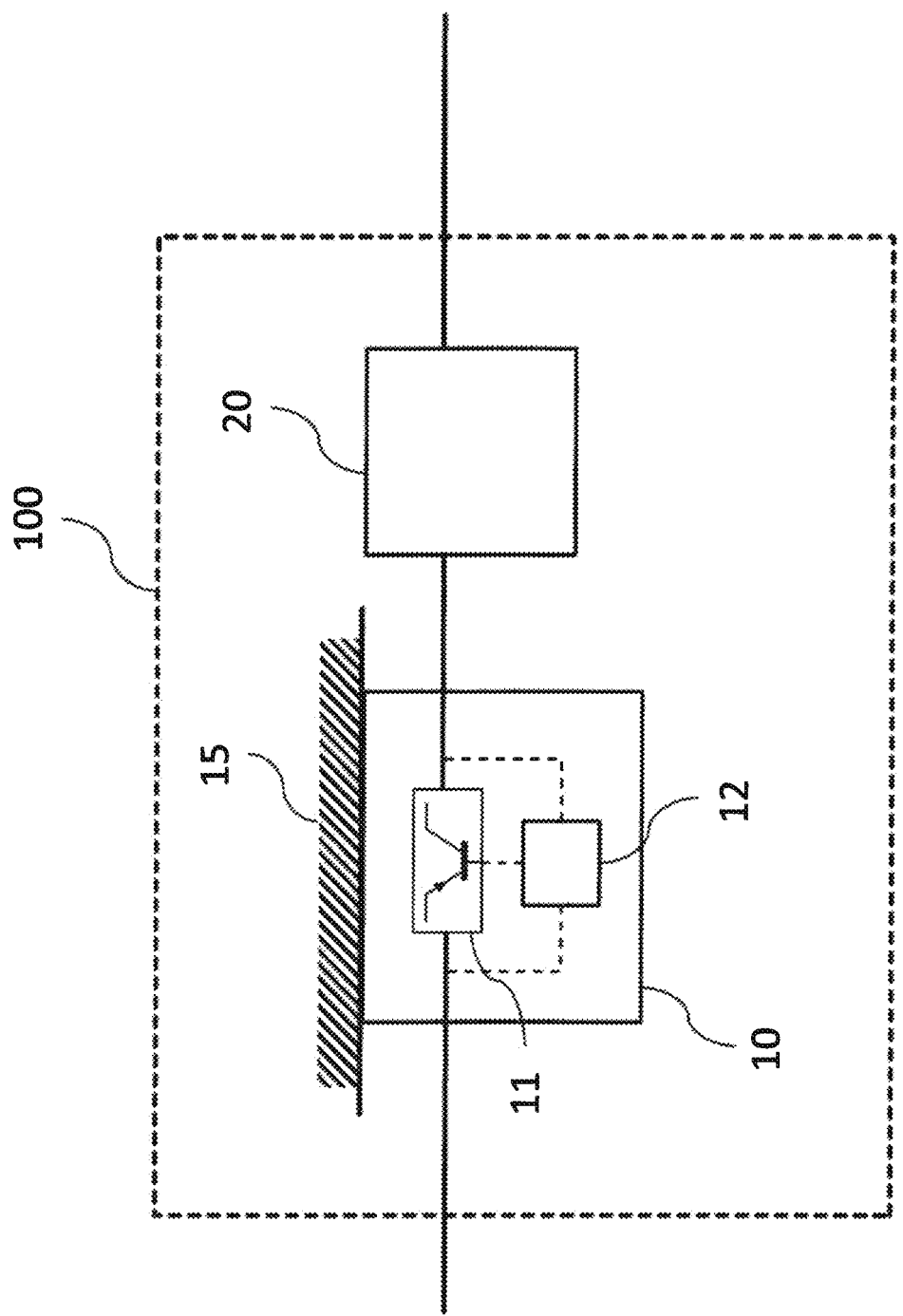
FIG. 3 shows an embodiment of the auxiliary voltage supply.

FIG. 3 shows an embodiment of the auxiliary voltage supply 100. The linear pre-regulator 10 comprises furthermore a regulation unit 12 that operates the transistor 11 in the linear range such that the transistor 11 generates a voltage drop from the input voltage of the auxiliary voltage supply to a predetermined output voltage that is supplied to the linear voltage regulator 20. Transistor 11 is also referred to as longitudinal element. The regulation unit 12 monitors the input as well as also the output voltage of transistor 11.

If the input voltage from the voltage supply 40 is, for example, 12 V and the output voltage is to be, for example 5 V, the regulation unit 12 drives the transistor 11 in the linear range such that the transistor 11 functions as adjustable resistor. In this case the resistance of transistor 11 is regulated such that the output voltage of transistor 11 is, for example, 6.5 V. The linear voltage regulator 20 subsequently regulates the provided 6.5 V to the required 5 V. This means the main portion of the power loss is not generated in the linear voltage regulator 20 but rather in the linear pre-regulator 10.

The heat produced by transistor 11 is cooled by active cooling means 15 by means of the refrigerant utilized in the electric compressor. For this purpose the transistor 11 can be disposed in a thermally favorable housing form (for example TO-220) and be placed with this housing onto the cooling housing of the compressor.

The input voltage (nominally for example 12 V) from the voltage supply 40 cannot be assumed to be constant during operation. In practice, the auxiliary voltage supply 100 must be able (requirement according to LV 124 for motor vehicles under 3500 kg) to operate with input voltages of 7 V (undervoltage) to 18 V (overvoltage). At voltages above 18 V to 32 V no voltage supply of load 30 must be ensured. However, the auxiliary voltage supply 100 should survive this overvoltage without damage and be subsequently ready to function again.

For this purpose the regulation unit 12 can additionally monitor the input voltage of the auxiliary voltage supply and switch off the transistor 11 if the input voltage exceeds a threshold value. The threshold value is, for example, 18 V. It is here of advantage to provide a hysteresis in the shutdown.

Figure 4:
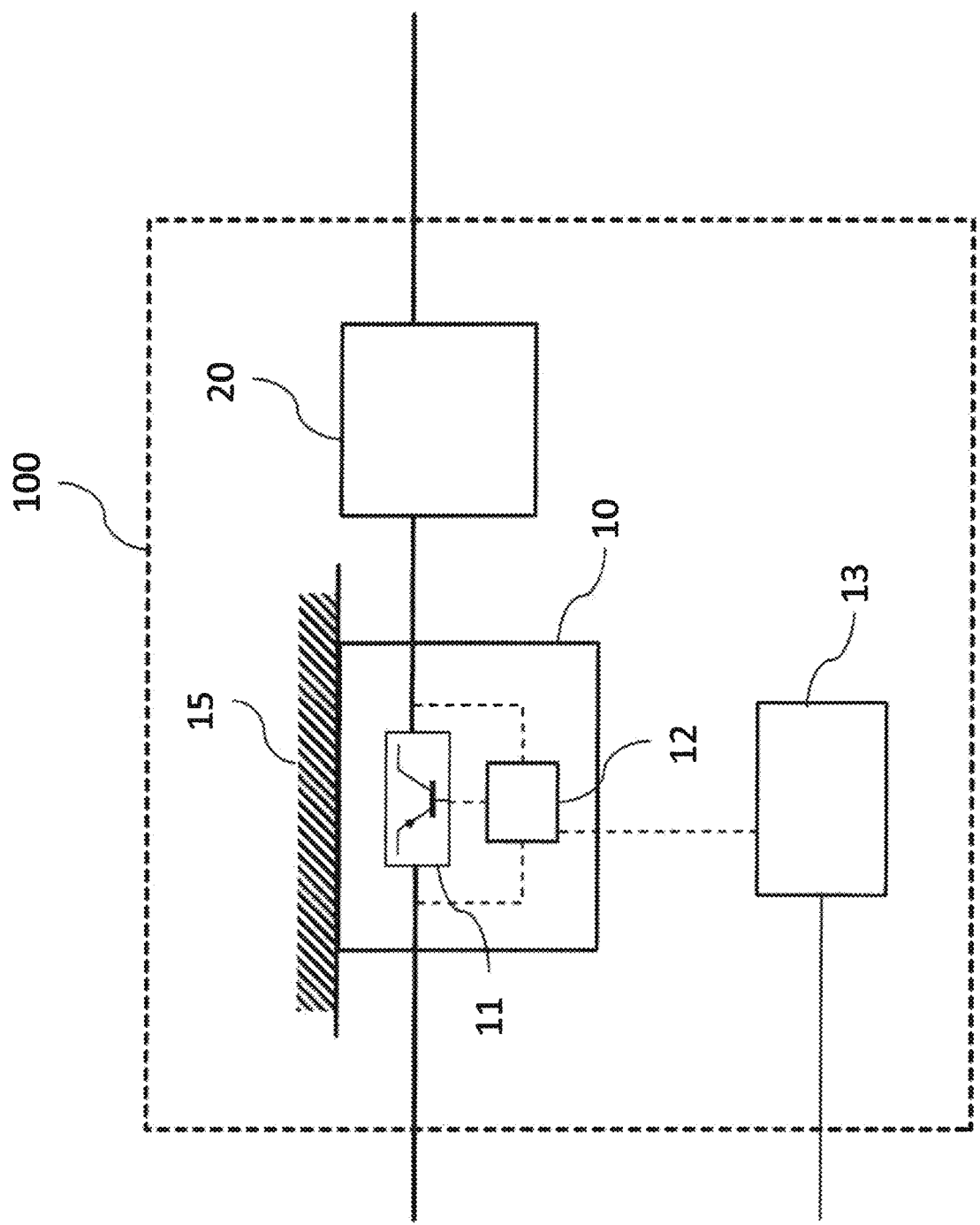
FIG. 4 shows a further embodiment of the auxiliary voltage supply.

FIG. 4 shows a further embodiment of the auxiliary voltage supply 100. The auxiliary voltage supply 100 comprises furthermore a control unit 13 which, in response to a shutdown signal, switches off transistor 11. This shutdown (inhibit) signal is transmitted, for example by an air conditioning control device of the motor vehicle to the control unit 13. The voltage supply 100 is hereby switched into sleep mode with low voltage consumption.

Figure 5:
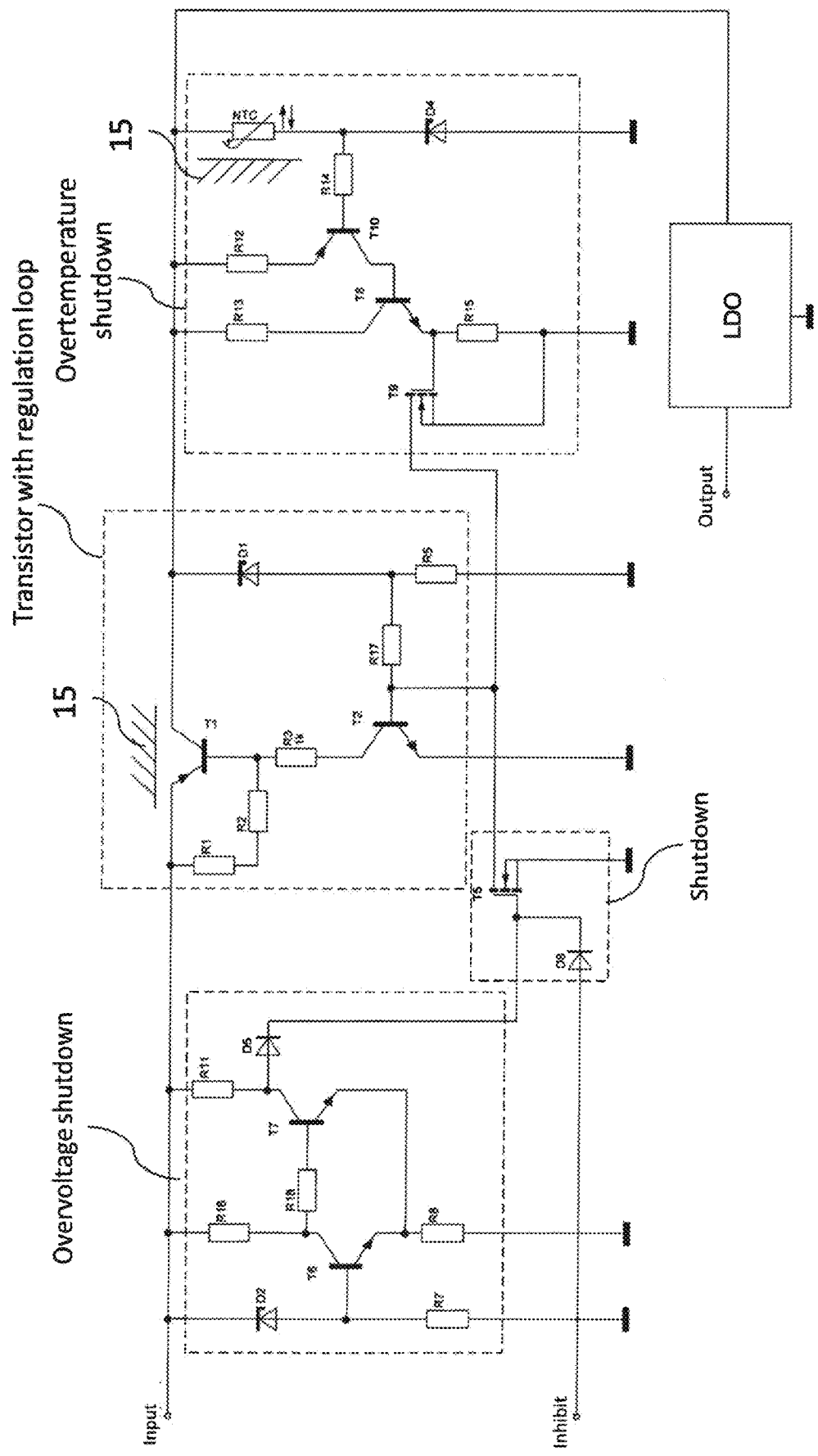
FIG. 5 shows a circuit diagram of the auxiliary voltage supply according to an embodiment of the present invention.

FIG. 5 shows a circuit diagram of the auxiliary voltage supply 100 according to an embodiment of the present invention. The auxiliary voltage supply 100 comprises a transistor T1 that is actively cooled by a cooling surface 15. The auxiliary voltage supply 100 comprises further a regulation loop which regulates the resistance of transistor T1 based on the input and output voltage of transistor T1.

The auxiliary voltage supply 100 comprises an overvoltage shutdown with hysteresis which switches off the transistor T1 if the input voltage exceeds a threshold value. The hysteresis results in the threshold value shutdown not taking place immediately upon the threshold value being reached, but rather with a certain tolerance. Hereby a surge of the circuit is prevented if the input voltage fluctuates about the threshold value.

The auxiliary voltage supply 100 can furthermore comprise an overtemperature shutdown. This monitors the temperature of transistor T1. If the temperature of transistor T1 exceeds a threshold value of, for example, 125° C., transistor T1 is switched off. This is especially useful in the presence of strongly fluctuating cooling capacities of the electric refrigerant compressor in order to prevent thermal overloading.

Transistor T1 can additionally be switched off via a shutdown (inhibit) signal.

Figure 6:
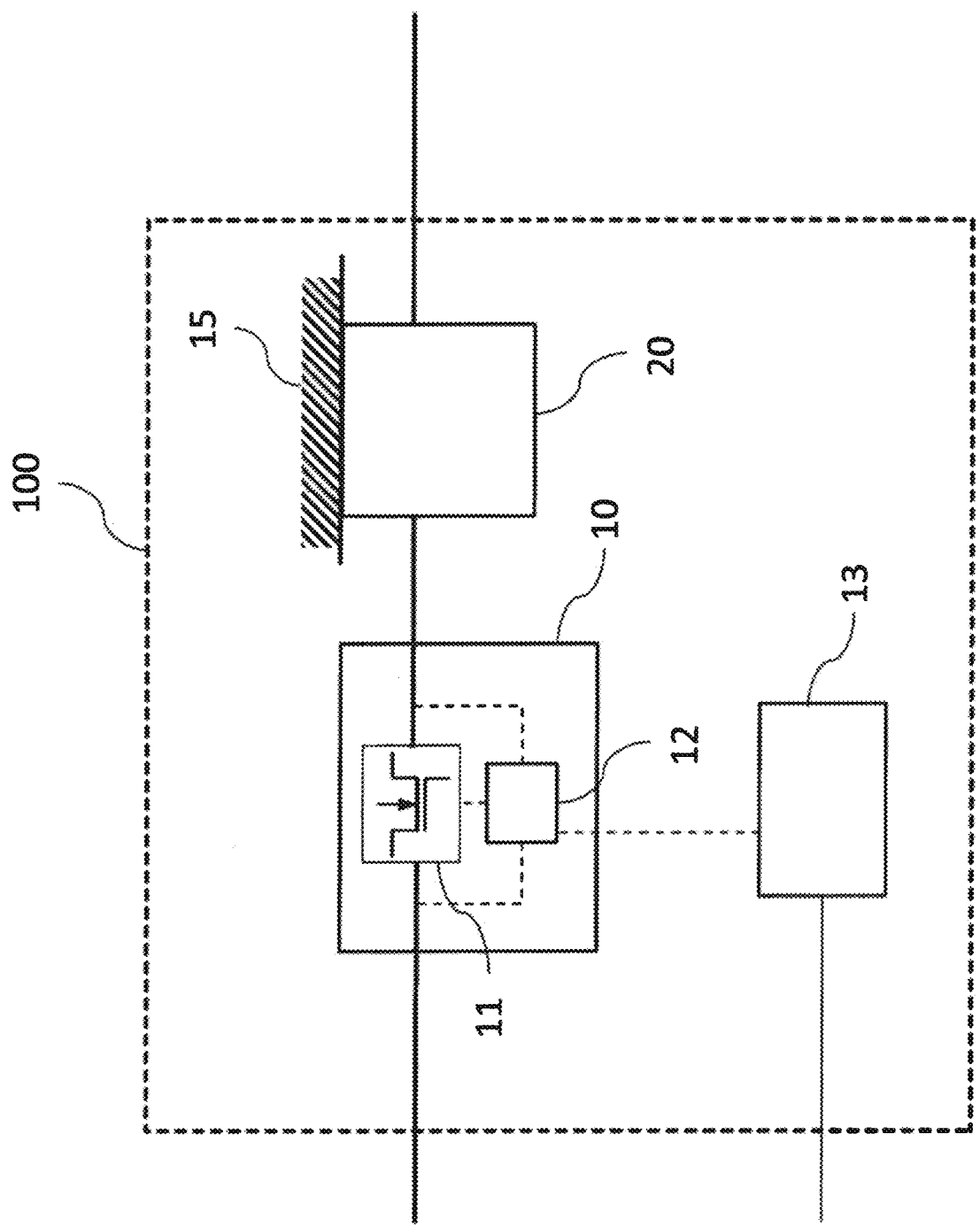
FIG. 6 shows a further embodiment of the auxiliary voltage supply according to the invention.

FIG. 6 shows a further embodiment of the auxiliary voltage supply 100 according to the invention. This embodiment is based on the embodiment shown in FIG. 4. However, in this embodiment not the transistor 11 is actively cooled but rather the linear voltage regulator 20. When switched on, transistor 11 is as low ohmic as feasible. The main portion of the voltage drop consequently occurs at the linear voltage regulator 20 such that it must be cooled.

Transistor 11 serves in this embodiment to carry out an overvoltage shutdown and/or to switch off the auxiliary voltage supply 100 in response to a shutdown signal.

This embodiment is especially advantageous if by the auxiliary voltage supply 100 only a low power for the load 30 must be provided (for example 100 mA at an on-board voltage of 12 V). In this case a conventional LDO can be utilized as the linear voltage regulator 20.

Figure 7:
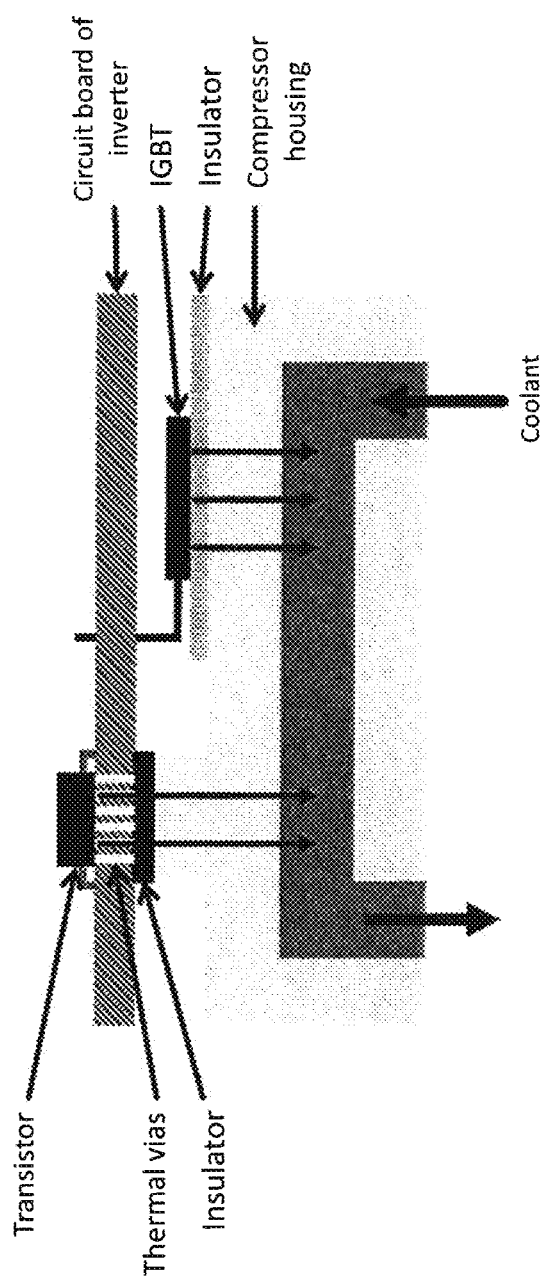
FIG. 7 shows the active cooling means of the transistor or the linear voltage regulator in an embodiment of the present invention.

FIG. 7 shows an active cooling of transistor 11 or of linear voltage regulator 20 in an embodiment of the present invention. The transistor 11 is disposed on a circuit board of the inverter and via thermal vias connected to the housing of the electric compressor. The thermal vias are thermally conducting through-holes through the circuit board which, for example, are comprised of zinc. In the electric compressor circulates a coolant. The heat flow from the transistor to the coolant is indicated in FIG. 7 by two arrows. Such a configuration can dissipate more than 2-W heat. FIG. 7 shows moreover that further components of the inverter (here IGBTs) of a bridge circuit, which change the incoming DC current to AC current, can be cooled.

The invention claimed is:

1. An inverter for an electric compressor, wherein
the inverter comprises an auxiliary voltage supply which supplies a control electronics of the inverter with DC voltage,
the auxiliary voltage supply comprises a series circuit of a linear voltage regulator and a linear pre-regulator, and
the linear pre-regulator comprises a transistor which is connected to the input terminal of the linear voltage regulator, wherein only one of the linear pre-regulator and the linear voltage regulator is actively cooled by a refrigerant utilized in the electric compressor, wherein the linear pre-regulator comprises furthermore a regulation unit which operates the transistor in the linear range such that the transistor generates a voltage drop from the input voltage of the auxiliary voltage supply to a predetermined output voltage, and wherein the transistor is disposed on a circuit board of the inverter and via thermal vias connected to an housing of the electric compressor, wherein the thermal vias are thermally conducting through-holes through the circuit board.

2. The inverter according to claim 1, wherein the main portion of the power loss is not generated in the linear voltage regulator but rather in the linear pre-regulator and the linear voltage regulator operates with minimal difference between the input voltage of the linear voltage regulator and the output voltage of the linear voltage regulator in the range of 0.1 V to 1 V, and wherein the regulation unit monitors the input voltage of the auxiliary voltage supply and switches off the transistor if the input voltage exceeds a threshold value.

3. The inverter according to claim 1, wherein the auxiliary voltage supply comprises furthermore a control unit which switches off the transistor in response to a shutdown signal.

4. The inverter according to claim 1, wherein the inverter comprises a high-voltage domain, which supplies a motor of the electric compressor with AC current, and a low-voltage domain, which processes control commands for the control of the electric compressor, and the auxiliary voltage supply is disposed in the low-voltage domain.

5. The inverter according to claim 1,
wherein the linear voltage regulator is a low-dropout voltage regulator.

6. The inverter according to claim 1, wherein the transistor is a metal oxide semiconductor field effect transistor (MOSFET).

7. An inverter for an electric compressor, wherein
the inverter comprises an auxiliary voltage supply which supplies a control electronics of the inverter with DC voltage,
the auxiliary voltage supply comprises a series circuit of a linear voltage regulator and a linear pre-regulator, and
the linear pre-regulator comprises a transistor which is connected to the input terminal of the linear voltage regulator, wherein only one of the linear pre-regulator and the linear voltage regulator is actively cooled by a refrigerant utilized in the electric compressor, wherein the linear pre-regulator comprises furthermore a regulation unit which operates the transistor in the linear range such that the transistor generates a voltage drop from the input voltage of the auxiliary voltage supply to a predetermined output voltage, wherein the main portion of the power loss is not generated in the linear voltage regulator but rather in the linear pre-regulator and the linear voltage regulator operates with minimal difference between the input voltage of the linear voltage regulator and the output voltage of the linear voltage regulator in the range of 0.1 V to 1 V, wherein the linear pre-regulator comprises furthermore a regulation unit which monitors the input voltage of the auxiliary voltage supply and switches off the transistor if the input voltage exceeds a threshold value, wherein the transistor is disposed on a circuit board of the inverter and via thermal vias connected to an housing of the electric compressor, wherein the thermal vias are thermally conducting through-holes through the circuit board, and wherein the auxiliary voltage supply comprises furthermore a control unit which switches off the transistor in response to a shutdown signal.

* * * * *